United States Patent

Sherman

Patent Number: 5,966,371
Date of Patent: Oct. 12, 1999

[54] METHOD AND SYSTEM FOR REDUCING INTERBEAM INTERFERENCE AND MULTIPATH FADING IN BENT-PIPE SATELLITE COMMUNICATIONS SYSTEMS

[75] Inventor: Matthew J. Sherman, North Arlington, N.J.

[73] Assignee: AT&T Corp., New York, N.Y.

[21] Appl. No.: 08/953,600

[22] Filed: Oct. 17, 1997

[51] Int. Cl.[6] .................................................. H04B 7/216
[52] U.S. Cl. ..................... 370/320; 370/335; 370/342; 375/200; 455/12.1
[58] Field of Search ...................... 370/315, 316, 370/317, 318, 319, 320, 329, 335, 338, 342; 375/200, 206, 208; 455/11.1, 12.1, 13.1, 13.2, 13.3, 13.4, 422, 427, 428, 95, 98

[56] References Cited

U.S. PATENT DOCUMENTS

| | | | |
|---|---|---|---|
| 5,566,164 | 10/1996 | Ohlson | 370/320 |
| 5,594,941 | 1/1997 | Dent | 455/13.4 |
| 5,640,386 | 6/1997 | Wiedeman | 370/320 |
| 5,765,098 | 6/1998 | Bella | 455/13.3 |
| 5,793,757 | 8/1998 | Uddenfeldt | 370/335 |
| 5,815,527 | 9/1998 | Erving et al. | 375/206 |

Primary Examiner—Ajit Patel
Assistant Examiner—Bob A. Phunkulh

[57] ABSTRACT

A method and system of forming and processing communication links in a satellite communications system. The satellite communications system includes a plurality of groups of transmitters, a satellite and a plurality of destination receivers. Each transmitter is associated with only one transmitter group and transmits a communications signal. Each respective communications signal is a CDMA signal having a predetermined code that is associated with a transmitter. Each respective predetermined code is selected from a code set assigned to the group of transmitters with which the transmitter is grouped. Each code set is different from code sets associated with the transmitters of other selected transmitter groups so that the code sets are arranged in a code set pattern that is repeated for selected groups of transmitters. The satellite receives the communications signals and groups together each received communications signal having a same predetermined code set. The code sets of selected uplink communications signals in a group of received communications signals are fully or partially despread, filtered, and respread so that the group of communications signals contains communications signals from only one code set. Each group of communications signals is then transmitted to a different destination receiver, or groups on different code sets to the same destination receiver.

33 Claims, 8 Drawing Sheets

METHOD AND SYSTEM FOR REDUCING
INTERBEAM INTERFERENCE AND
MULTIPATH FADING IN BENT-PIPE
SATELLITE COMMUNICATIONS SYSTEMS

CROSS-REFERENCE TO RELATED
APPLICATIONS

The present application is related to an application entitled "Method and System For Reducing Multipath Fading In Bent-pipe Satellite Communications Systems" by Matthew J. Sherman, application Ser. No. 08/953,020, filed concurrently with the present application, and incorporated by reference herein.

BACKGROUND OF THE INVENTION

1. Field of the Invention

The present invention relates to the field of telecommunications. More particularly, the present invention relates to a method and a system for eliminating interbeam interference and multipath fading caused by multiple uplink beams coupling in a bent-pipe satellite communications system.

2. Description of the Related Art

In a bent-pipe satellite communications system that combines four spatially adjacent uplink beams, with each beam using spread-spectrum techniques for beam separation, multipath fading can occur if two or more of the adjacent uplink beams are routed on-board a satellite to the same destination earth station receiver, such as an earth station for a terrestrial gateway communications system. While the spread-spectrum code set used with a particular uplink beam would be different from the code set used on adjacent uplink beams, an uplink signal transmitted from the edge of one beam couples equally well to an adjacent beam. If the two adjacent beams carrying the uplink signal are routed to the same gateway receiver, a multipath condition can exist because the same signal has been effectively transmitted on the two adjacent beams and combined prior to being received at the gateway receiver. That is, since RF phasing of the transponders of the two adjacent uplink beams can vary, destructive interference may occur between the two RF paths, resulting in a substantial loss of signal power at the gateway receiver. In effect, the gateway receiver receives the same signal from two different sources by the intercoupling of uplink signals between adjacent uplink beams. In addition, second tier interference may be introduced by transmitters in other beams utilizing the same code sets.

Figure 1:
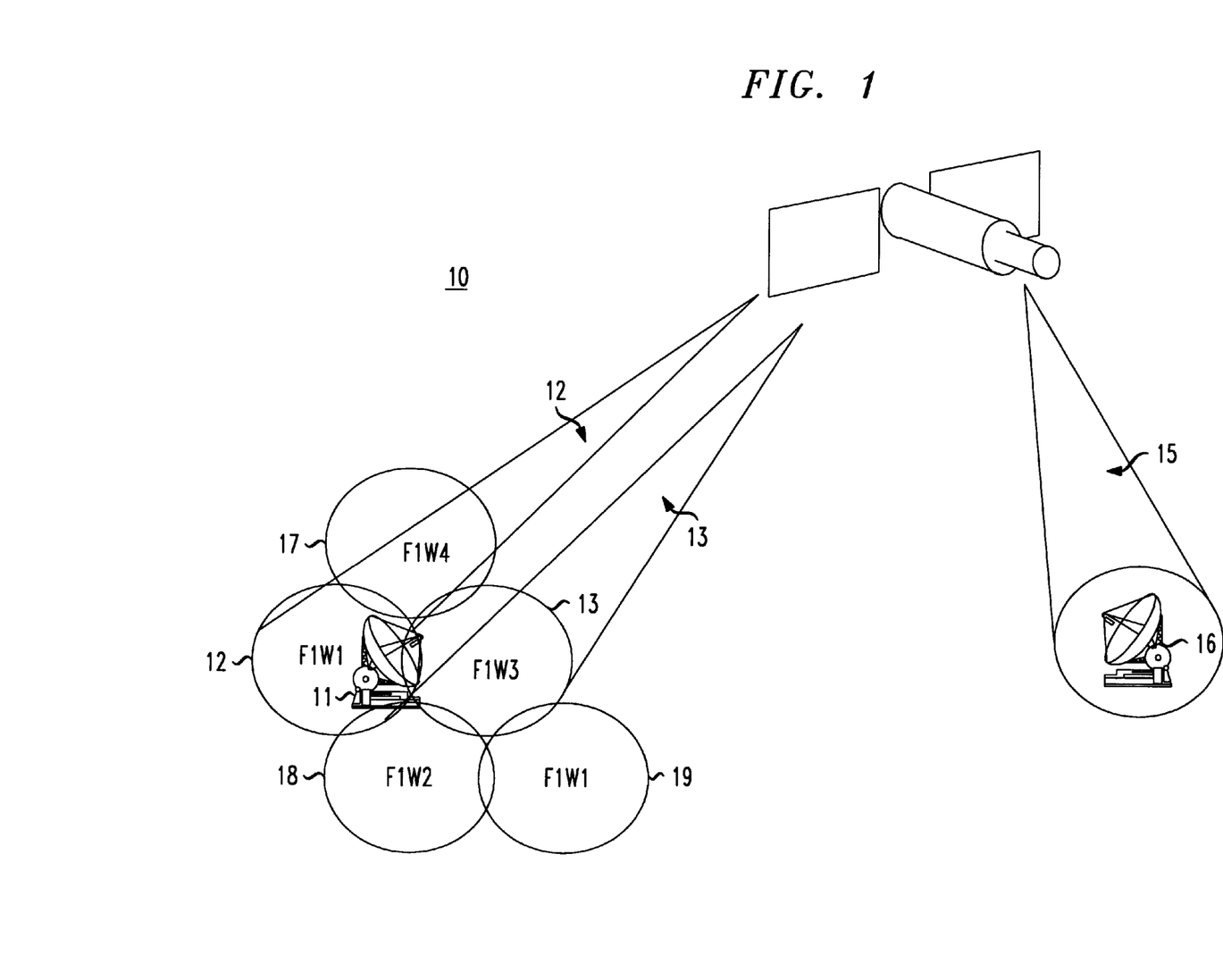
FIG. 1 shows an exemplary bent-pipe satellite communications system in which the present invention eliminates multipath fading and second tier interference that occurs if two or more adjacent uplink beams are downlink routed to the same terrestrial gateway receiver.

FIG. 1 shows an exemplary multi-beam bent-pipe satellite communications system 10 that illustrates multipath fading caused by an uplink beam signal being coupled into two adjacent uplink beams and second tier interference. Satellite communications system 10 uses four spread-spectrum code sets, based, for example, on synchronous Walsh codes, for separating uplink beams 12, 13, 17 and 18 in a well-known manner, each of which accept transmitted signals using uplink frequency F1. The exemplary code sets are referred to herein as W1–W4. A ground station 11 transmits an uplink communications signal using uplink beam 12. While only ground station 11 is shown within the geographic region covered by beam 12, there are a plurality of ground stations within the geographic region covered by beam 12, but are not shown. Ground station 11 is geographically located near the edge of beam 12 such that the transmitted signal is also coupled into adjacent uplink beam 13. Beams 12 and 13 are received by satellite 14, combined with each other (and beams 17 and 18), and transmitted over a downlink beam 15 to a common earth station receiver 16, such as a terrestrial gateway. System 10 includes a plurality of gateway receiver stations, of which only gateway receiver 16 is shown. Multipath fading occurs at gateway receiver 16 because multiple versions of the signal from ground station 11 are received (effectively) from two different paths and are potentially destructively combined prior to being received by gateway receiver 16. Other beams, for instance, beam 19, which utilizes the same code set as beam 12 (and potentially the same code as ground station 11), couple into the beams adjacent to beam 12, such as beams 13 and 18, causing second tier interference when combined by the satellite and received by gateway receiver 16.

Figure 2:
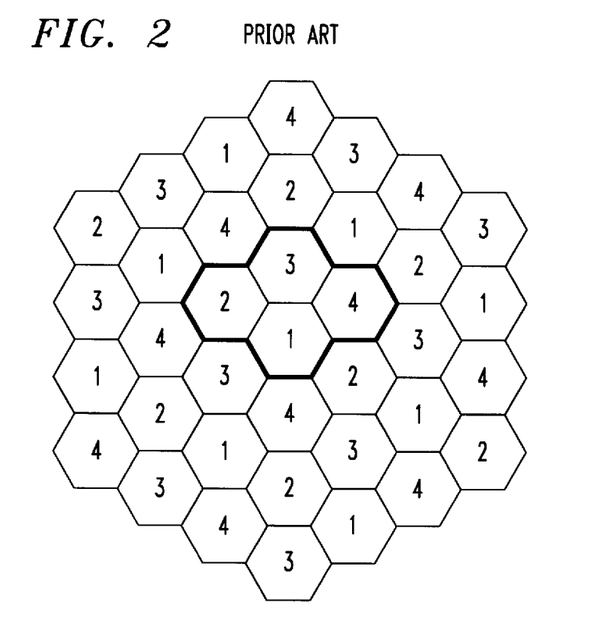
FIG. 2 show a conventional uplink beam tiling pattern used by terrestrial and satellite communications systems.
Figure 3:
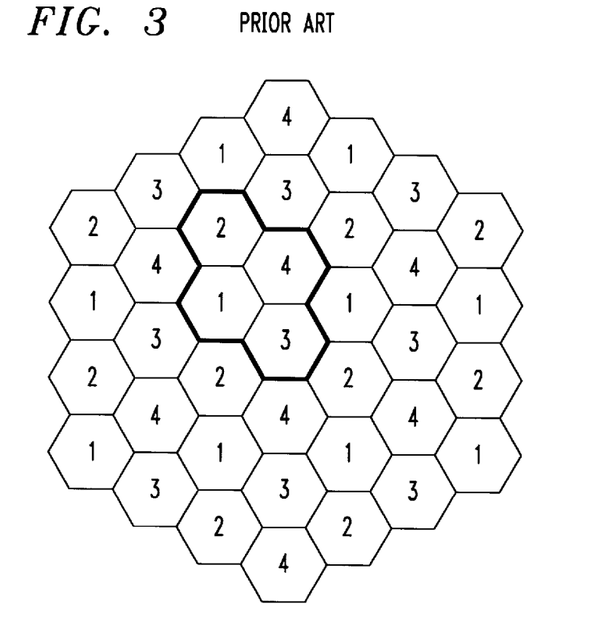
FIG. 3 shows another conventional uplink beam tiling pattern used by terrestrial and satellite communications systems.

FIGS. 2 and 3 respectively show conventional uplink beam tiling patterns for a reuse of four which can be used in satellite communications systems. Each hexagon shown in FIGS. 2 and 3 represents a different geographic region covered by a corresponding uplink beam. The numbers within the hexagons represent a partitioning of resources (such as frequencies, polarities, or code sets) between groups of geographic regions. All the users in geographic regions labeled 1 use the same resources, which are different from those used in regions 2, 3 and 4. A similar statement can be made for each regions 2, 3, and 4. The patterns shown in FIG. 2 and 3 are representative, and other tiling patterns for sharing resources between groups of regions 3, 7, 8, etc., also exist. Also shown in an outlined area of these Figures is a grouping of hexagons referred to herein as a "Beam Group". Each number of a beam group is assigned a different set of resources. By replicating a beam group multiple times, a full tiling pattern can be generated. It is assumed for this example, that each beam group is serviced by a different gateway receiver, although this is not required by the present invention. For example, see application Ser. No. 08/953,020.

Figure 4:
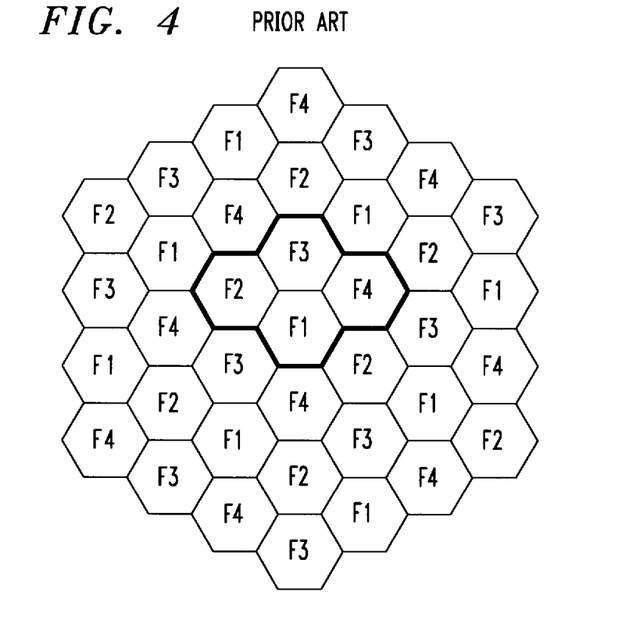
FIG. 4 shows a conventional uplink beam tiling pattern for a Frequency Division Multiple Access (FDMA) based system utilizing four different uplink frequencies F1–F4.
Figure 5:
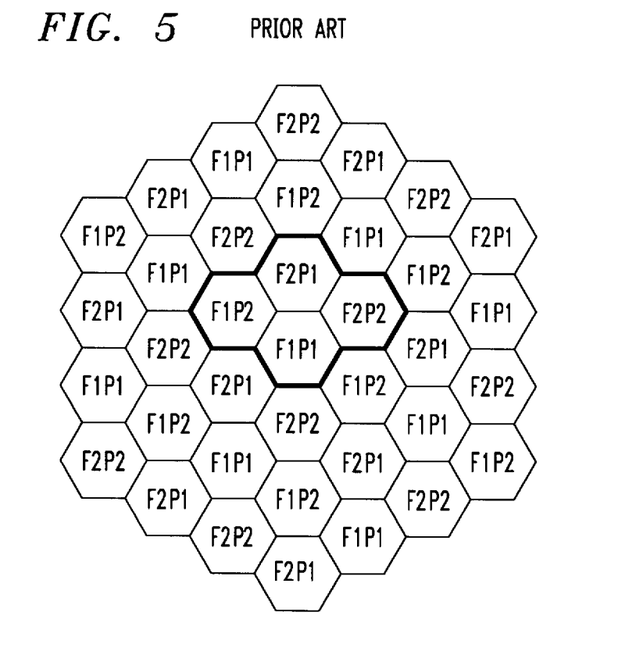
FIG. 5 shows a conventional uplink beam tiling pattern for an FDMA-based system utilizing different combinations of uplink frequencies F1 and F2 and two polarizations P1 and P2.
Figure 6:
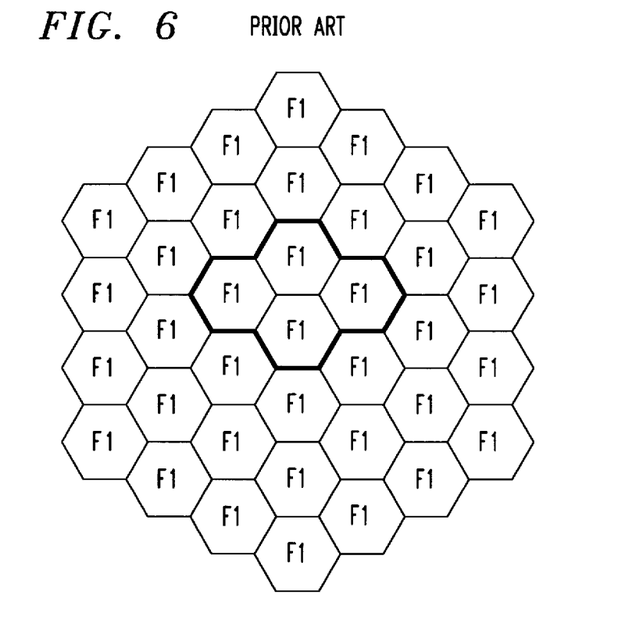
FIG. 6 shows a conventional uplink beam frequency tiling pattern for a Code Division Multiple Access (CDMA) based system.
Figure 7:
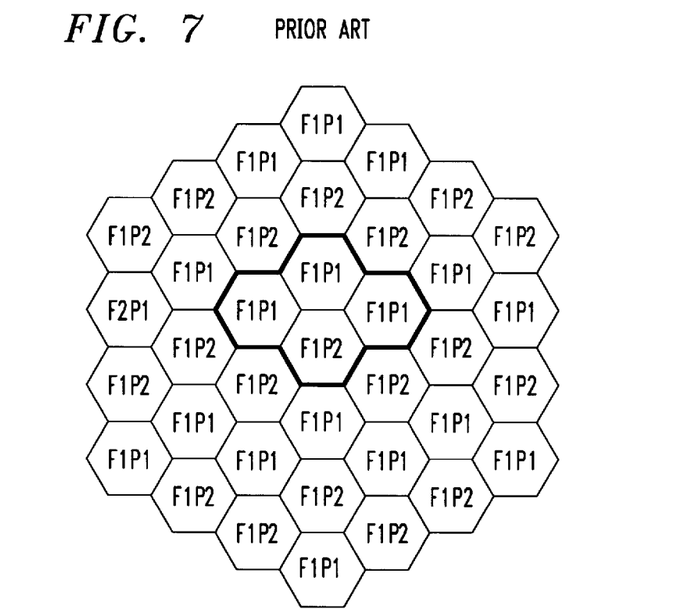
FIG. 7 shows an uplink code set tiling pattern for a CDMA-based system utilizing Walsh functions W1–W4 for subspreading.

FIG. 4 shows the tiling pattern of FIG. 2 applied to a conventional Frequency Division Multiple Access (FDMA) based system utilizing four different uplink frequency groups F1, F2, F3 and F4. Again, the outlined section indicates a beam group. FIG. 5 shows the tiling pattern of FIG. 2 applied to an FDMA-based system utilizing different combinations of uplink frequency groups F1 and F2 and two polarizations P1 and P2. FIG. 6 shows a conventional uplink beam frequency tiling pattern for a Code Division Multiple Access (CDMA) based system. Isolation between users in different beams for such a system is provided by proper allocation of code sets between the beams. FIG. 7 shows the tiling pattern of FIG. 2 applied to codes for a representative CDMA-based system utilizing code sets W1–W4 for isolation between the beams.

Each of the tiling patterns of FIGS. 2–7 suffer from multipath fading that occurs when two adjacent uplink beams are downlink-routed to the same terrestrial gateway receiver. Also, they suffer from second tier interference through the introduction of signals that are twice removed from a desired beam, using the same resources, and are coupled via adjacent beams. In more advanced tiling schemes (such as described in application Ser. No. 08/953, 020 and shown in FIG. 8) this "second tier" interference may still exist, although not strictly originating from second tier beams. In an FDMA system, this multipath condition and interference is easily remedied through the application of appropriate filtering on-board the satellite. However, for CDMA systems where adjacent beams use the same frequency and polarization, the filtering techniques that are applied in an FDMA system cannot be used. Consequently, what is needed is a method and a system that eliminates the multipath fading and interference effects caused by an uplink transmission being coupled into adjacent uplink beams utilizing the same frequency and polarization, and downlink-routed to the same terrestrial gateway receiver, or routed to other terrestrial gateway receivers with other signals using the same code set.

SUMMARY OF THE INVENTION

The present invention provides a method and a system that eliminates multipath fading and interference effects caused by an uplink transmission that is coupled into adjacent uplink beams, combined with a copy of itself or with signals from other beams using the same code sets, and downlink-routed to the same terrestrial gateway receiver. The advantages of the present invention are provided by a method and system for processing communication links in a satellite communications system. The satellite communications system includes a plurality of transmitter groups (TGs), a satellite and a plurality of destination receivers. Transmitter groups are determined according to which satellite uplink communications beam is assigned. All members of a TG are assigned to the same beam. Each TG is assigned a different beam and corresponding uplink resources. Each transmitter transmits a communications signal and is associated with only one transmitter group. Each respective communications signal is a code division multiple access (CDMA) signal selected from a predetermined code set that is associated with the transmitters of the transmitter group. Each respective code set is different from other code sets associated with the transmitters of selected transmitter groups so that they form a reuse pattern that is repeated for each beam group. The satellite receives the communications signals and groups together all received communications signals having a same predetermined code set on to a beam. The code sets of selected uplink communications signals in a group of received communications signals are translated to other code sets (including the possibility of being translated back to its own code set) and combined with signals from other beams so that the group of communications signals contains communications signals each having different codes. In the translation process, each signal is filtered for eliminating undesired multipath and interference from other beams. Bulk translation and filtering may be performed to simplify processing on board the satellite. The satellite then transmits each group of communications signals to a different destination receiver.

BRIEF DESCRIPTION OF THE DRAWING

The present invention is illustrated by way of example and not limitation in the accompanying figures in which like reference numerals indicate similar elements and in which.

DETAILED DESCRIPTION

The present invention eliminates multipath fading and interbeam interference occurring in bent-pipe satellite communications systems when an uplink signal is coupled into two spatially adjacent uplink beams along with other interfering signals which, in turn, are then downlink routed to the same destination receiver. To eliminate the effects caused by adjacent beam coupling, the present invention provides a method and an apparatus that ensures that potential multipath and same code set interference are removed prior to being downlinked to destination receivers. That is, the communications signals received by the satellite are sufficiently despread (though not demodulated) and sufficiently filtered to ensure removal of multipath and interference effects. The communications signals are respread (possibly on different code sets than used for uplink transmission), combined with transmissions received on other beams (using other downlink code sets to avoid interference), and then downlinked to destination receives. In this way, the efficiency and performance of a satellite communications system are improved dramatically.

Figure 8:
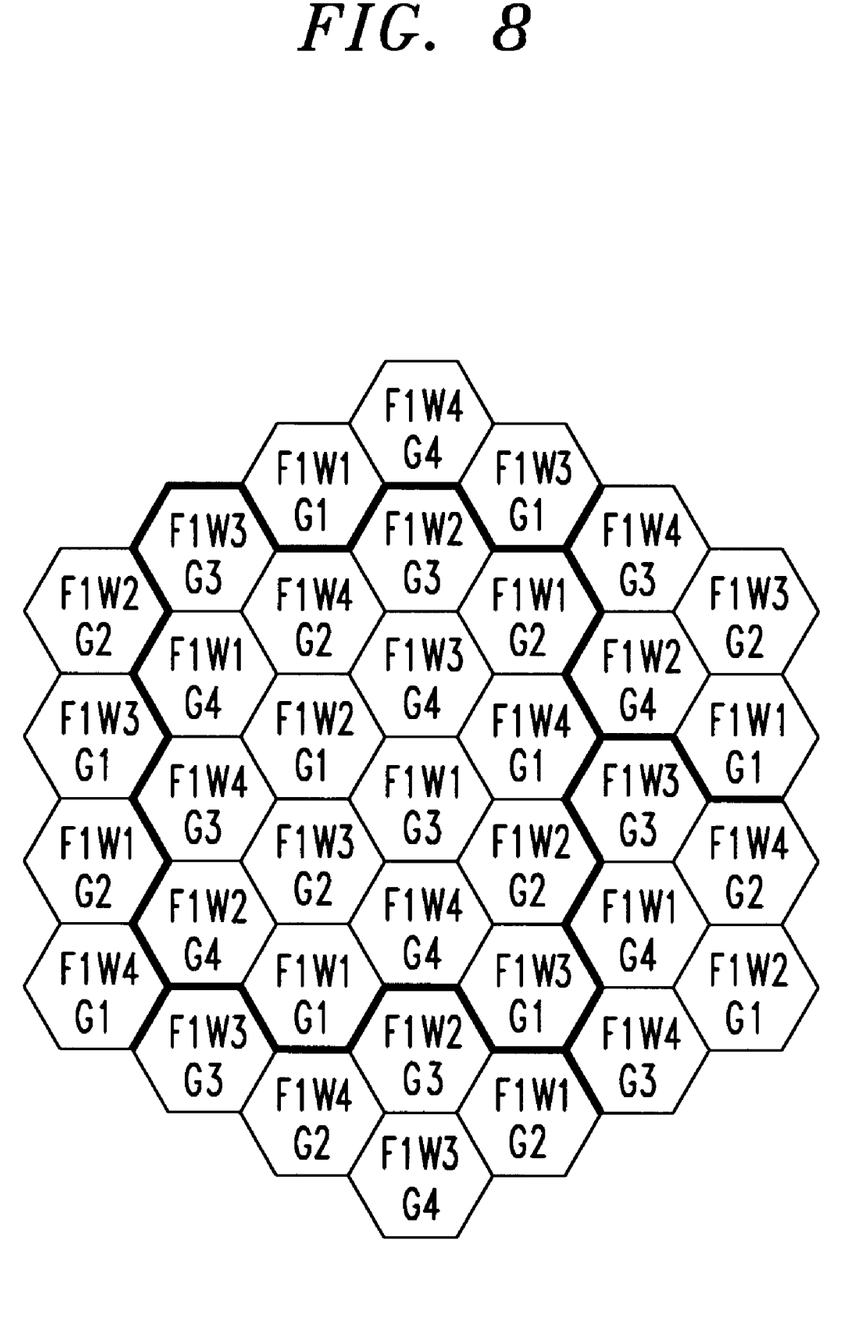
FIG. 8 shows an illustrative embodiment of an uplink/gateway tiling pattern for a CDMA-based system according to the invention described in application Ser. No. 08/953,020.

FIGS. 7 and 8 show illustrative embodiments of beam tiling patterns for a CDMA-based system that can be used with the present invention. Referring to FIGS. 1 and 8, four different code sets W1–W4 are utilized for separating adjacent uplink beams 12 and 13 in a well-known manner.

Figure 9:
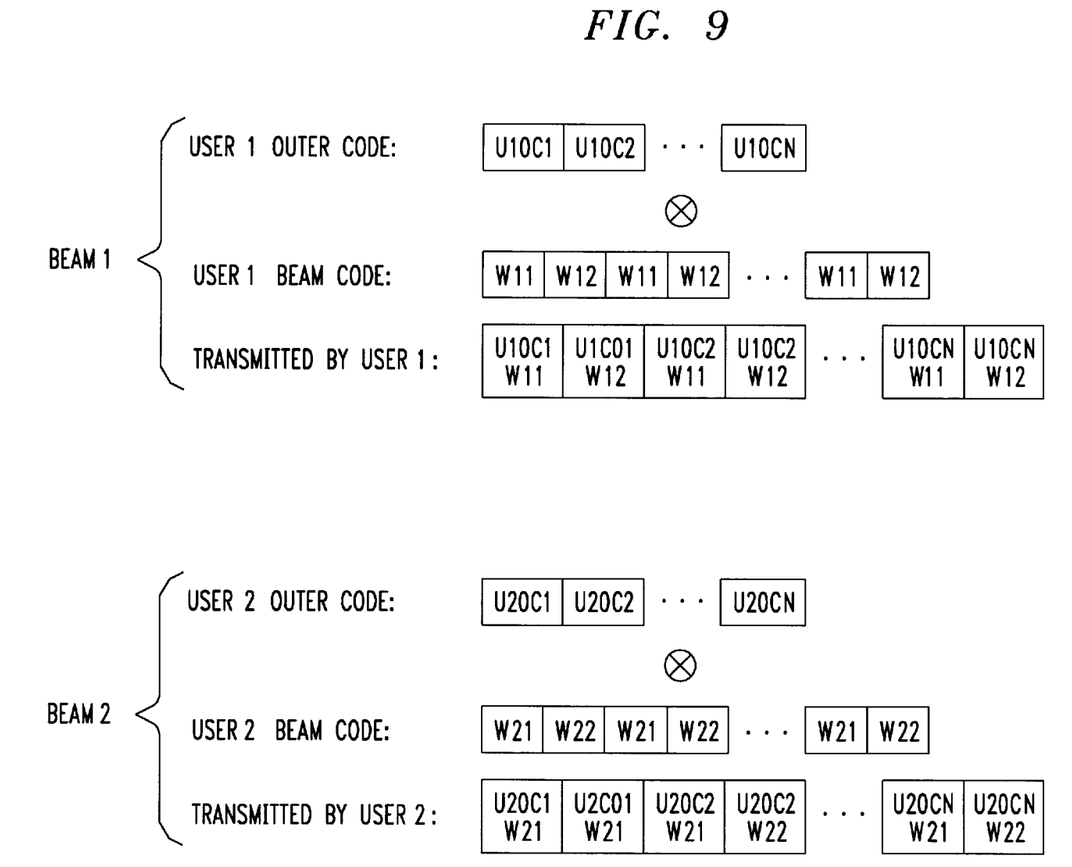
FIG. 9 illustrates an exemplary coding technique that facilitate bulk processing of CDMA signals according to the present invention.

FIG. 9 illustrates an exemplary coding technique that can be used with the present invention for allowing implementation of bulk partial despreading and filtering of CDMA signals. In FIG. 9, four synchronous orthogonal Walsh codes W11, W12, W21 and W22 are used to "sub-spread" the four distinct code sets used in each beam group, since each beam uses a different subspreading code common to all signals in a beam. The sub-spreading code can also be termed a "Beam" code. Other well-known orthogonal codes, such as a quadratic residue code, or nonorthogonal codes, such as Gold codes, can also be used. In asynchronous systems, coding schemes that are based on cyclic shift codes can be used. These "sub-spreading" codes then are used as building blocks for longer spread-spectrum codes that are used by individual transmitting earth stations. The transmit codes are formed by using various coding techniques (such as already mentioned) with the subspreading codes. The subspreading codes allow bulk partial despreading of all signals in a beam using a signal operation. The despreading occurs such that the signals from other adjacent beams are eliminated or become out-of-band responses that are eliminated by bandpass filtering (either RF or IF). Then, the signals are respread to their original bandwidth using the same or, if desired, a different subspreading code. The signals are then combined with signals from other beams using different downlink code sets so not to interfere, and downlinked to a common terrestrial gateway receiver. In one embodiment of the present invention, each individual signal received in a beam can be fully despread, filtered and respread by a bank of signal processors operating on the signals in a beam at either RF or IF. The key is that interference and multipath from other beams are eliminated in the spread spectrum signals prior to combining them with signals from other beams for downlink transmission to a common terrestrial gateway receiver.

Figure 10:
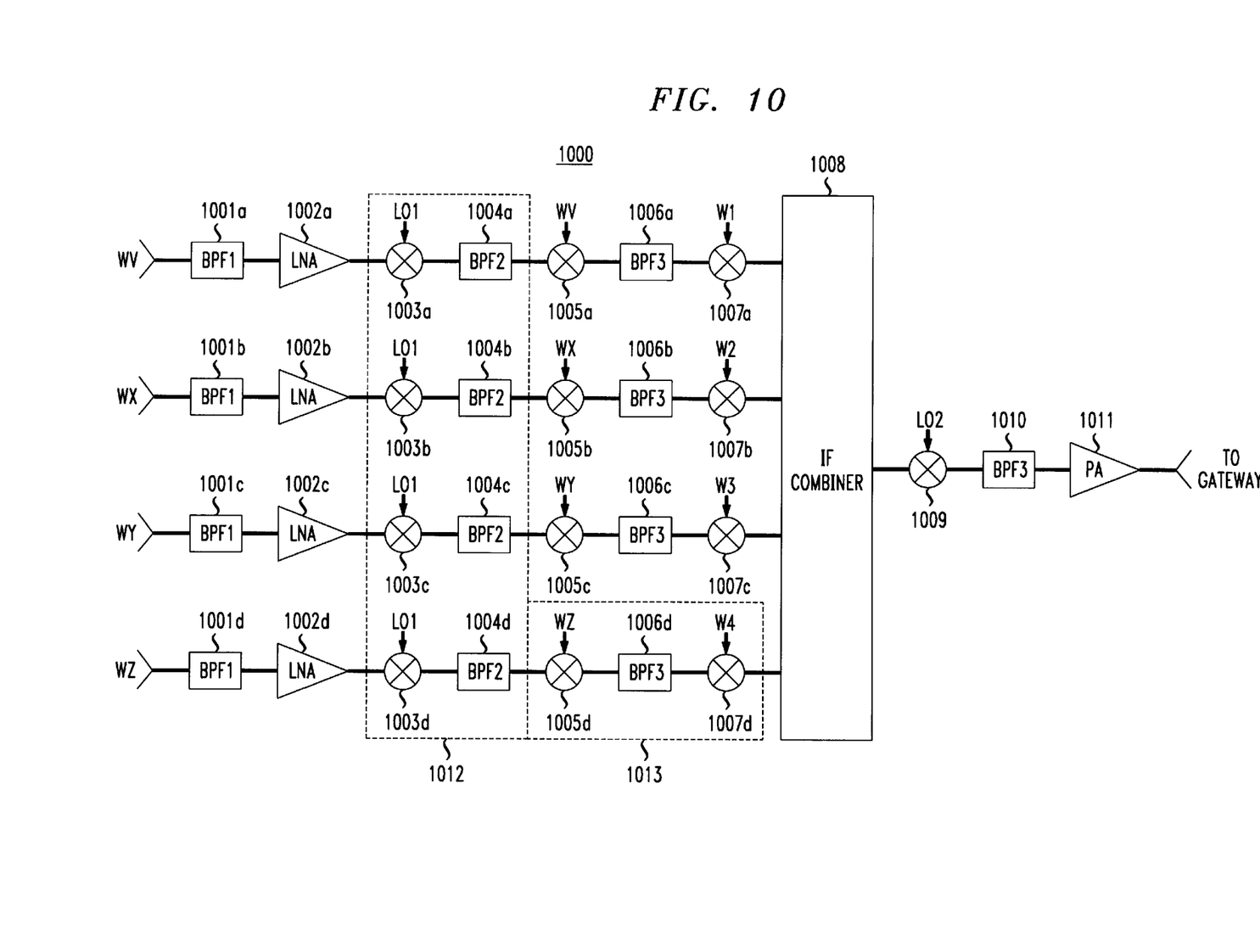
FIG. 10 shows a schematic block diagram of a portion of a satellite that is part of a satellite communications system according to the present invention.

FIG. 10 shows a schematic block diagram of a portion of a satellite 1000 that is part of a satellite communications system that uses four uplink beam code sets (WV, WX, WY and WZ). All received uplink beam signals from the same code set are respectively grouped together in a well-known manner. According to the invention, each code set WV, WX, WY and WZ can be a single code when subspreading is used, or be a separate code set. Each group of uplink beam carrier signals respectively pass through a first bandpass filter 1001a–1001d and then are respectively amplified by a low-noise amplifier LNA 1002a–1002d. After low-noise amplification, each respective uplink beam signal is down-converted at mixers 1003a–1003d into four separate IF signals using a first local oscillator LO1. The four IF signals then respectively pass through a second bandpass filter 1004a–1004d before being respectively despread by mixers 1005a–1005d. The despread IF signals are respectively bandpass filtered at bandpass filters (BPFs) 1006a–1006d and respread using a different code set (W1, W2, W3 and W4) at mixers 1007a–1007d before being input to an IF combiner 1008 to form a single IF signal. IF combiner 1008 is a standard 4:1 IF combiner. The IF signal output from IF combiner 1008 is up-converted at mixer 1009 to a selected RF frequency using a second local oscillator LO2. The RF signal then passes through a fourth bandpass filter 1010 before being amplified by a power amplifier PA 1011 for downlink transmission to a terrestrial gateway.

Alternatively, the down-conversion and filtering process performed by mixers 1003a–1003d and BPFs 1004a-1004b, indicated by 1012, can be omitted so that the bulk despreading and respreading occurs at RF frequencies. Accordingly, the center frequency of bandpass filters 1006a–1006d is the center frequency of each respective uplink transmission signal, IF combiner 1008 is replaced by an standard 4:1 RF combiner and local oscillator LO2 converts the RF signal output from the RF combiner to an appropriate downlink frequency in a well-known manner.

Figure 11:
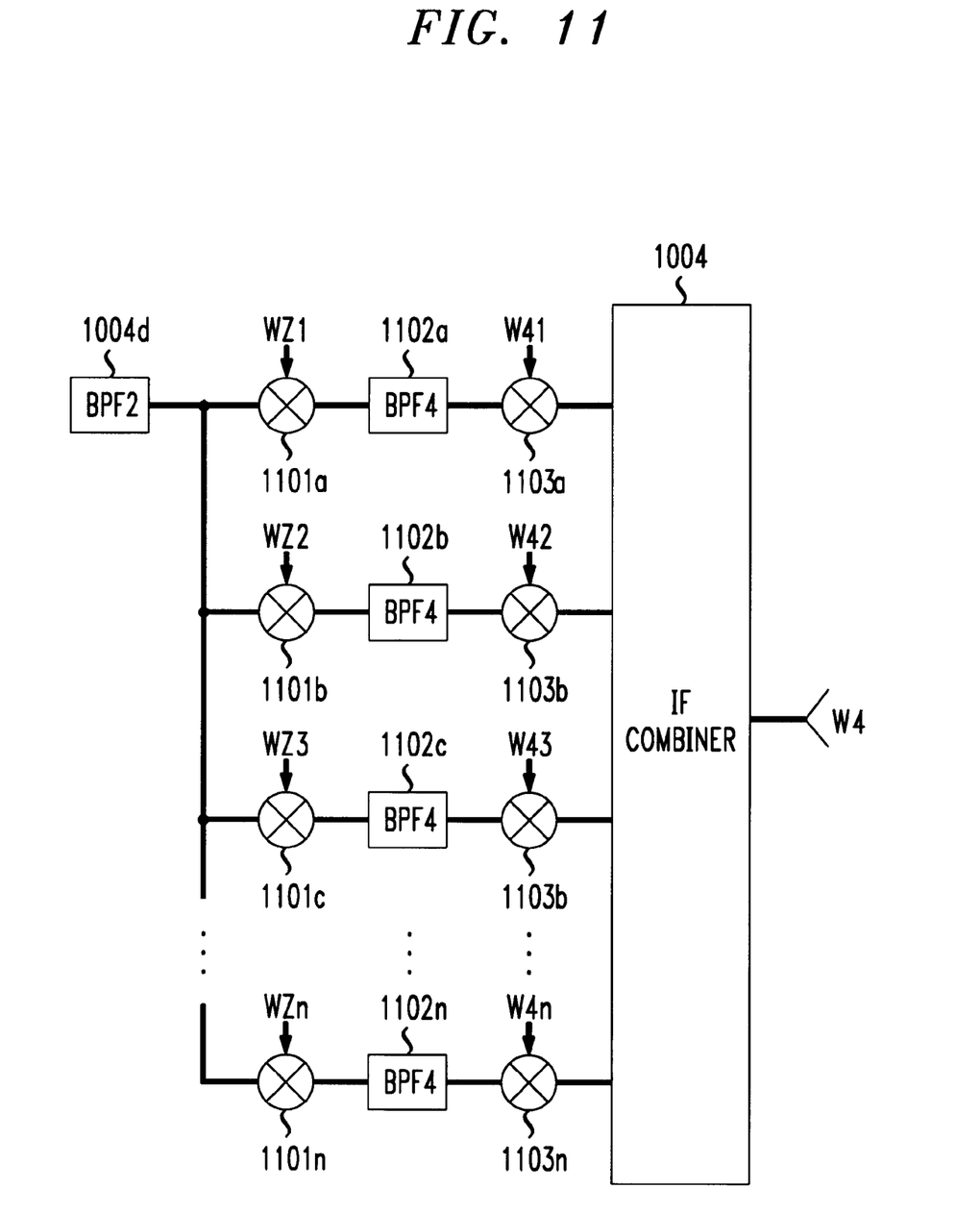
FIG. 11 shows a schematic block diagram of a sub-despreading/sub-respreading circuit according to the invention that would be substituted for despreading/respreading used in the schematic block diagram of FIG. 10.

When each code set WV, WX, WY and WZ shown in FIG. 10, is a set of codes, each subspreading code is despread accordingly. FIG. 11 shows a schematic block diagram of a sub-despreading/sub-respreading circuit that would be substituted for despreading/respreading block 1013. While the circuit of FIG. 11 replaces only despreading/respreading functional block indicated by 1013, a circuit similar to that of FIG. 11 will be used for each code set WV–WZ.

In FIG. 11, the IF signal output from BPF2 1004d is sub-despread by a plurality of mixers 1101a–1101n, where n is the number of codes forming the sub-spreading code. Each sub-despread signal is respectively bandpass filtered by bandpass filters BPF4 1102a–1102n and respective sub-respread by mixers 1103a–1103n. The output of mixers 1103a–1103n are combined by a standard n:1 IF combiner to form a single IF that is input to IF combiner 1008 (FIG. 10).

When the down-conversion and filtering process indicated by 1012 in FIG. 10 is not used, the sub-despreading and sub-respreading functions shown in FIG. 11 occurs at RF frequencies and, consequently, IF combiner is replaced by a standard n:1 RF combiner.

To facilitate radio processing, four groups of uplink beam signals are shown formed in FIG. 10 because four distinct beam code sets are used, but any number of groups can be formed as long as the number of groups formed equals the number of distinct beam code sets used in the satellite communications system. An advantage of this approach in the present invention is that all received uplink beams using the same code set must, by definition, be at least second tier with respect to other uplink beams using the same code set. Thus, by using this approach, no substantial multipath and/or interbeam interference situations exist at a given destination receiver.

While the present invention has been described using an exemplary orthogonal coding scheme, the present invention can be equally applied to any satellite communications system where two adjacent beams received at the satellite are sent to the same destination receiver. Further, it will be appreciated and understood that modifications may be made without departing from the true spirit and scope of the invention.

What is claimed is:

1. A method of forming a communication link in a satellite communications system, the method comprising the steps of:

receiving a plurality of communications signals at a satellite, each respective communications signal being transmitted from a transmitter of a group of transmitters, the group of transmitters being one of a plurality of groups of transmitters, each transmitter being associated with only one group, each respective communications signal being a code division multiple access signal having a predetermined code that is associated with the transmitter transmitting the communications signal, the predetermined code being selected from a first predetermined code set that is assigned to the group of transmitters with which the transmitter is grouped, each respective code set being different from other code sets associated with selected groups of transmitters so that the code sets are arranged in a code set pattern, the code set pattern being repeated for each selected group of transmitters;

grouping together communications signals received on a beam having a same predetermined code set;

despreading the communications signals; and respreading the communications signals using a second predetermined code set.

2. The method according to claim 1, wherein the step of despreading partially despreads the communications signals, and the step of respreading partially respreads the communications signals.

3. The method according to claim 2, wherein the step of partially despreading the communications signals bulk partially despreads the communications signals, and bulk partially respreads the communications signals.

4. The method according to claim 1, wherein the step of despreading fully despreads the communications signals, and the step of respreading fully respreads the communications signals.

5. The method according to claim 4, wherein the step of fully despreading the communications signals bulk fully despreads the communications signals, and bulk fully respreads the communications signals.

6. The method according to claim 1, wherein the second predetermined code set is the same as the first predetermined code set.

7. The method according to claim 1, wherein the second predetermined code set is different from the first predetermined code set.

8. The method according to claim 1, further comprising the step of eliminating signals from the communications signals that use code sets on adjacent beams.

9. The method according to claim 8, wherein the step of eliminating includes the step of filtering the communications signals.

10. The method according to claim 1, further comprising the step of transmitting each group of communications signals to a respectively different destination receiver.

11. The method according to claim 1, further comprising the step of transmitting each group of communications signals to a same destination receiver.

12. The method according to claim 1, wherein the codes of each code set are orthogonal with respect to each other.

13. The method according to claim 1, wherein the codes of each code set are nonorthogonal with respect to each other.

14. The method according to claim 1, wherein the codes of each code set are based on an asynchronous coding scheme.

15. The method according to claim 1, wherein a number of transmitters in a group of transmitters equals a number of distinct codes in each code set.

16. The method according to claim 15, wherein the code set pattern is formed by four code sets.

17. The method according to claim 16, wherein the downlink receivers are earth station receivers.

18. A satellite communications system comprising:
    a plurality of groups of transmitters, each transmitter transmitting a communications signal, each transmitter being associated with only one group, each respective communications signal being a code division multiple access signal having a predetermined code that is associated with the transmitter, the predetermined code being selected from a first predetermined code set that is assigned to the group of transmitters with which the transmitter is grouped, each respective code set being different from other code sets associated with the transmitters of other selected groups of transmitters so that the code sets are arranged in a code set pattern, the code set pattern being repeated for each selected group of transmitters; and
    a satellite receiving the communications signals, the satellite grouping together communications signals received on a beam having a same predetermined code set, despreading the communications signals, respreading the communications signals using a second predetermined code set, and transmitting each group of communications signals to a destination receiver.

19. The satellite communications system according to claim 18, wherein the satellite partially despreads and partially respreads the communications signals.

20. The satellite communications system according to claim 19, wherein the satellite bulk partially despreads and bulk partially respreads the communications signals.

21. The satellite communications system according to claim 18, wherein the satellite fully despreads and fully respreads the communications signals.

22. The satellite communications system according to claim 21, wherein the satellite bulk fully despreads and bulk fully respreads the communications signals.

23. The satellite communications system according to claim 18, wherein the second predetermined code set is the same as the first predetermined code set.

24. The satellite communications system according to claim 18, wherein the second predetermined code set is different from the first predetermined code set.

25. The satellite communications system according to claim 18, wherein the satellite filters signals from the communications signals that use code sets on adjacent beams.

26. The satellite communications system according to claim 18, wherein the satellite transmits each group of communications signals to a respectively different destination receiver.

27. The satellite communications system according to claim 18, wherein the satellite transmits each group of communications signals to a same destination receiver.

28. The satellite communications system according to claim 18, wherein the codes of each code set are orthogonal with respect to each other.

29. The satellite communications system according to claim 18, wherein the codes of each code set are nonorthogonal with respect to each other.

30. The satellite communications system according to claim 18, wherein the codes of each code set are based on an a synchronous coding scheme.

31. The satellite communications system according to claim 18, wherein a number of transmitters in a group of transmitters equals a number of distinct codes in each code set.

32. The satellite communications system according to claim 31, wherein the code set pattern is formed by four code sets.

33. The satellite communications system according to claim 32, wherein the downlink receivers are earth station receivers.

* * * * *